(No Model.)
J. KRESS.
HOOF PAD.
No. 449,368.  Patented Mar. 31, 1891.
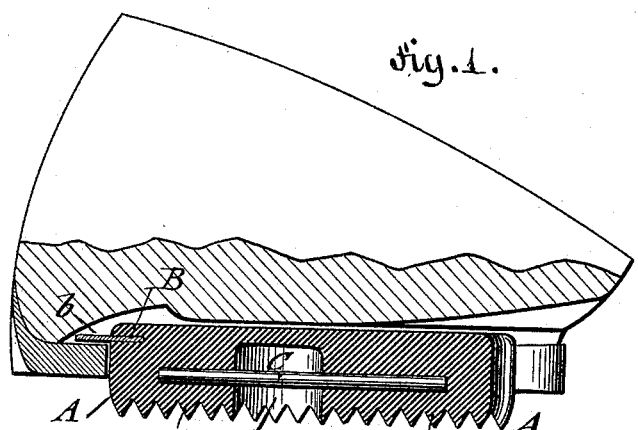
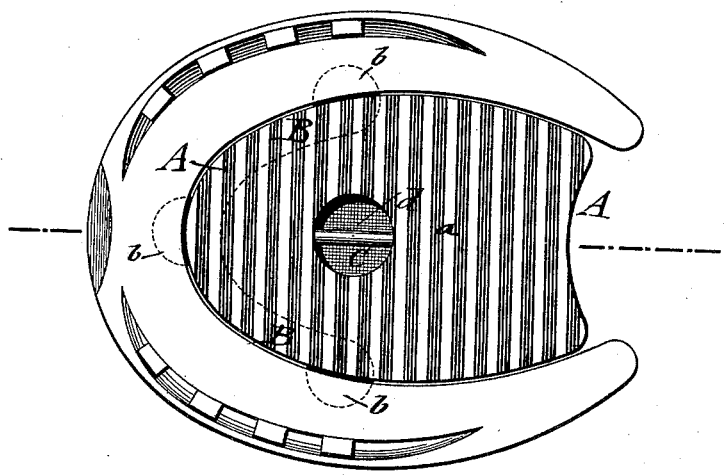
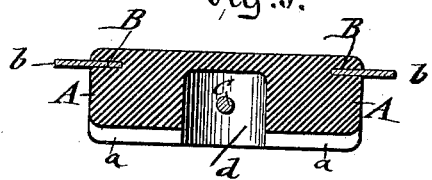
WITNESSES:
Geo. W. Rosenbaum.
Charles Schroeder
INVENTOR:
John Kress
BY
Popeck Raegner
ATTORNEYS.
THE NORRIS PETERS CO., PHOTO-LITHO., WASHINGTON, D. C.

UNITED STATES PATENT OFFICE.

JOHN KRESS, OF NEW YORK, N. Y.

HOOF-PAD.

SPECIFICATION forming part of Letters Patent No. 449,368, dated March 31, 1891.

Application filed January 7, 1891. Serial No. 376,961. (No model.)

*To all whom it may concern:*

Be it known that I, JOHN KRESS, of the city, county, and State of New York, a citizen of the United States, have invented certain new and useful Improvements in Hoof-Pads, of which the following is a specification.

This invention relates to an improved hoof-pad of that class which is inserted between the hoof and the shoe for the purpose of giving the horse a better foothold on frozen ground or streets covered with ice or asphalt pavements, said pad protecting at the same time the frog of the hoof and preventing the balling of the snow in the cavity formed by the frog and shoe.

The invention consists of a hoof-pad for horses, which is made of india-rubber or other suitable elastic material, and provided at the front and sides with projecting lugs that are embedded in the body of the pad and inserted between the hoof and shoe. The pad is provided at its under side with transverse ribs and at its middle portion with a cavity and a longitudinal pin embedded in the pad, said pin serving to attach one member of the tongs by which the pad is bent, so as to permit the insertion or removal of the same to the hoof.

In the accompanying drawings, Figure 1 represents a vertical longitudinal section of a horse's hoof with my improved pad applied to the same. Fig. 2 is a bottom view of the shoe and pad, and Fig. 3 is a vertical transverse section of the pad shown as detached from the hoof.

Similar letters of reference indicate corresponding parts.

Referring to the drawings, A represents a hoof-pad, which is made of india-rubber or other suitable elastic material and of such a size as to fit into the space formed at the interior of the horseshoe and the frog.

The pad A is provided at its under side with transverse ribs $a$, by which a better foothold is secured for the horse's foot on smooth or slippery ground, such as streets covered with asphalt pavements or with ice or snow.

The pad A is provided at its front end and opposite sides with projecting lugs $b\,b$, which are made in one piece with an arc-shaped steel plate B, that is embedded in the elastic material of the pad during its manufacture. By bending the pad by means of suitable tongs the lugs $b\,b$ can be readily inserted between the hoof and shoe, so as to retain the pad securely in position on the hoof.

The pad A is extended to near the rear end of the shoe, so as to prevent thereby the entering of snow and the balling of the same at the frog of the hoof. It is provided at its middle portion with a cavity $d$, in which is arranged a longitudinal pin C, which is securely embedded into the pad A, as shown clearly in Fig. 1, and which serves for being taken hold of by one member of a pair of tongs, while the other forked member of the tongs is pressed against the sides of the pad, so that the same is bent symmetrically to its longitudinal axis, whereby its size is reduced, so that the pad can be readily inserted into the hoof for use or removed from the same after the horse is returned to the stable, to prevent the undue heating of the frog.

When the horse has to go out on slippery ground, the pads are applied to its hoofs, the same supplying an effective hold for the horse's feet on the ground and preventing thereby the accidents that so frequently arise on smooth and slippery pavements.

Having thus described my invention, I claim as new and desire to secure by Letters Patent—

1. A hoof-pad for horses, composed of an elastic pad having transverse ribs at its under side, projecting lugs out of its front end and sides, a cavity at its middle portion, and a longitudinal pin secured to the pad and extending centrally through the cavity, substantially as set forth.

2. A hoof-pad for horses, consisting of a pad of elastic material having transverse ribs at its under side, an arc-shaped plate embedded into the front part of the pad and provided with projecting lugs at the front and sides, a cavity at the middle portion of the pad, and a longitudinal pin embedded in the pad and extending centrally through said cavity, substantially as set forth.

In testimony that I claim the foregoing as my invention I have signed my name in presence of two subscribing witnesses.

JOHN KRESS.

Witnesses:
 PAUL GOEPEL,
 CHARLES SCHROEDER.